April 8, 1947.  J. W. SUYDAM  2,418,607
ELECTRIC MOTOR
Filed Aug. 2, 1944  2 Sheets-Sheet 1

INVENTOR
Joseph W. Suydam
BY Edwin Guthrie
ATTORNEY

April 8, 1947.  J. W. SUYDAM  2,418,607
ELECTRIC MOTOR
Filed Aug. 2, 1944  2 Sheets-Sheet 2
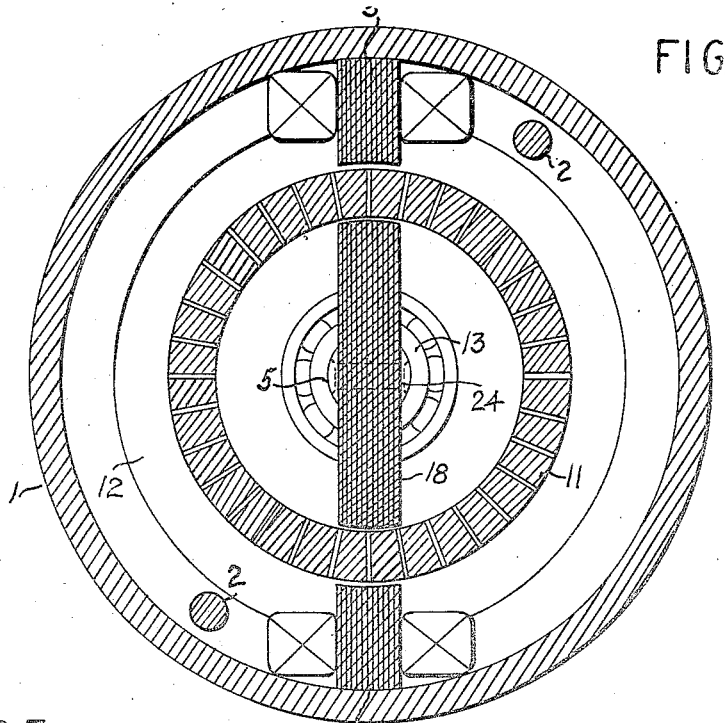
FIG.2
FIG.3
FIG.4
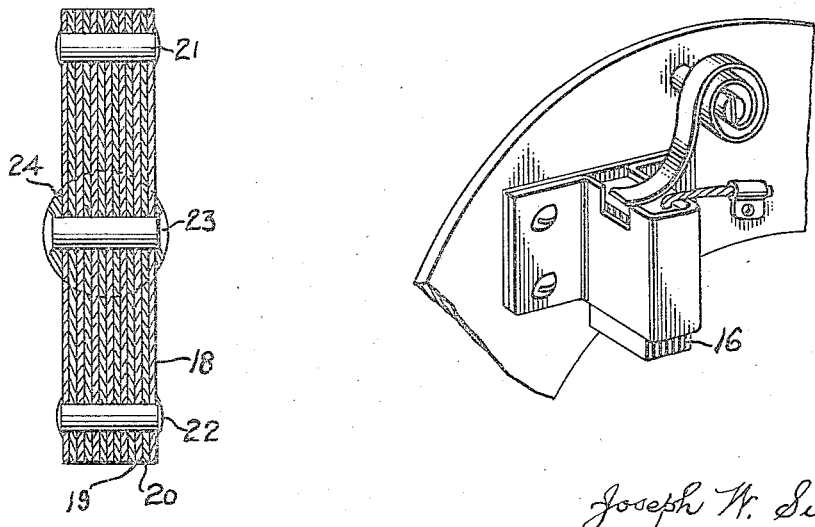
Inventor
Joseph W. Suydam,
By Edwin Guthrie.
Attorney Patented Apr. 8, 1947

2,418,607

UNITED STATES PATENT OFFICE 2,418,607

ELECTRIC MOTOR

Joseph W. Suydam, Blue Point, N. Y.

Application August 2, 1944, Serial No. 547,704

4 Claims. (Cl. 171—252)

This invention relates to electric motor construction, and has for its object the special formation and disposition of mechanical parts whereby it is believed a superior motor is created for whatever purposes it may be used. It is believed to be particularly effective when used as a starting or actuating motor for airplanes.

The individual structure of this invention is illustrated in the accompanying drawings of which Fig. 1 represents a section lengthwise showing all parts assembled.

Fig. 2 is a sectional view of the motor taken transversely midway of Fig. 1.

Fig. 3 is the laminated plates body sectionally shown in the stationary member of the axial shaft member.

Fig. 4 is a detail illustration of one form of spring controlled motor brush assembly employed in this motor.

Throughout the drawings and specification the same number is used to refer to the same part.

Figure 1:
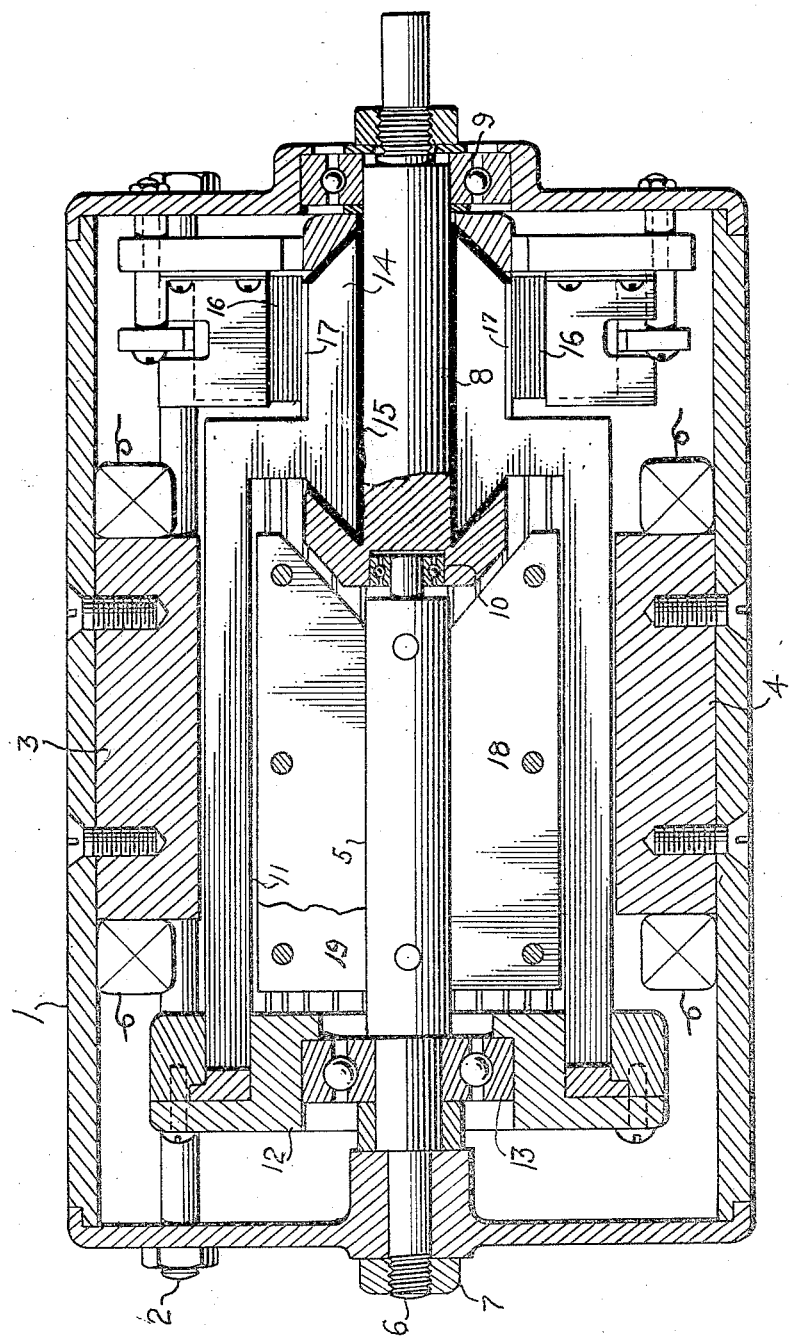

A casing 1 of any desired size and shape has its detachable portions secured together by the required number of bolts 2.

Suitably secured within the casing are the field magnets 3 and 4 as shown in Fig. 1. No limitation is intended herein as to the size, shape or disposition of the field magnets or the number thereof.

Extending axially within the casing is a shaft member comprising usually two associated portions. One portion 5 has its end 6 secured to the casing by the nut 7 which holds the portion 5 stationary. The second axial shaft portion 8 is revoluble, and has a bearing 9 on the casing as set forth in Fig. 1. The meeting ends of the axial shaft portions are usually connected in revoluble relation by the bearing 10 carried by the portion 8, although in some cases the necessary alignment between the shaft portions may be obtained without connecting the meeting ends.

In Fig. 1 is shown the extended longer parts of the conductor bars 11, of which there may be any desired number, and the ends of the bars are held in the mounting disk device 12 rotatively carried by the bearing 13 on the stationary axial shaft member 5. The disk 12 is of metal and conductively joins the ends of the bars and is revoluble as shown in Figs. 1 and 2. The other ends of the conductor bars 11 are formed into L-shaped terminations 14 which are arranged to be the segments of the motor commutator and are attached to the rotary axial member 8 by nut 19 and cone 15. The brushes 16 carried by the casing lead to the commutator and are usually arranged in contact with non-ferrous metal strips 17 soldered or brazed to the conductor L-shaped ends that constitute the commutator itself. As illustrated in Fig. 1 the longer straight parts of the conductor bars 11 pass by and near the poles of the field magnets.

Considering Figs. 1, 2 and 3, there will be noted a body of laminated plates 18. The plates are like pieces of steel, and in the practice of this invention it is usual to separate the laminations slightly with layers of non-metallic or insulating material such as plastic layers 20.

As shown in Fig. 3, rivets 21 and 22 secure the plates together, and rivet 23 attaches the laminations in a body to the stationary shaft portion 5, through which the laminations pass diametrically by way of a passage 24 in the shaft portion 5. It is held to be within the scope of this invention to extend the laminations radially in groups or bodies or as one body of plates of suitable form and number, with effective devices whereby the groups of laminations or the body thereof as a whole may be secured to the stationary shaft member.

The theory of the operation of this invention is the same as that of any other commutating electric motor, but it has been learned by trial and it is the conclusion of this applicant that the provision of the magnetic continuity resulting from the introduction of the laminations and the arrangement thereof as described effect more easy manufacture of light, durable, high speed motors.

Having now described this invention, I claim:

1. An electric motor construction, comprising an outer casing, field magnets located in the casing, electrical conductors and connections whereby said field magnets are energized, said casing having an axial shaft member comprising two aligned portions, one portion being secured at the end to said casing and held stationary, the second axial shaft portion being rotary, said casing having a bearing for the end of the said rotary axial portion, said stationary portion having an end provided with a bearing for the meeting end of said rotary portion, conductor bars arranged to move by and near the field magnet poles, each conductor bar having an L-shaped end extension arranged upon said rotary axial shaft portion, insulating material and clamping devices adapted to connect the said L-shaped ends of said bars and said rotary axial shaft portion, the said stationary axial shaft supporting a bearing located near its end and secured to the casing, a mounting conducting disk constructed to receive the ends of the said conductor bars in mutual electrical contact, said disk having rotary engagement with the said bearing on the stationary shaft portion, said L-shaped ends of the conductor bars arranged to form the commutator of the motor, brushes constructed and arranged to bear upon and supply electric current to the said commutator, said stationary axial shaft portion having a lengthwise and diametrical passage, magnetizable plate laminations placed flatwise together and secured whereby a body of laminated plates is formed, said body of plates passing through the passage in the said stationary axial shaft portion, and means for securing the laminated body in said passage.

2. An electric motor construction, comprising an outer casing, field magnets located in the casing, electrical conductors and connections whereby the field magnets are energized, said casing having an axial shaft member comprising two aligned portions, one portion being secured at the end to said casing and held stationary, the second axial shaft portion being rotary, said casing having a bearing for the end of said rotary axial portion, said stationary portion having an end provided with a bearing for the meeting end of said rotary portion, conductor bars having parts arranged to pass by and near the field magnet poles, each conductor bar having an L-shaped end extension arranged upon said rotary axial shaft portion, insulating material and clamping devices adapted to connect the said L-shaped ends of the bars and said rotary axial shaft portion, the said stationary axial shaft supporting a bearing located near its end secured to the casing, a mounting conducting disk constructed to receive the ends of said conductor bars in mutual electrical contact, the said disk having rotary engagement with the said bearing on the said stationary shaft portion, said L-shaped ends of the conductor bars arranged to form the commutator of the motor, brushes constructed and arranged to bear upon and supply electrical current to the said commutator, said stationary axial shaft portion having connected lengthwise therewith bodies of laminated plates disposed flatwise together and composed of magnetic metal, means for securing the said bodies of laminations to the said stationary shaft portion, and means for securing the said laminations together.

3. An electric motor comprising a casing having field magnets therein, said motor having an axial shaft member consisting of two aligned portions, one of said portions being connected with said casing and held stationary, the second aligned portion being rotary and provided with a bearing carried by the casing, said two aligned portions having ends connected in revoluble relation, conductor bars arranged to extend near and by said field magnet poles, a revoluble conducting disk joining the ends of said bars, said conductor bars being connected with parts forming the motor commutator, said commutator being carried by and insulated from said rotary axial shaft portion, brushes carried by the casing and arranged to contact with said commutator, said stationary shaft member having projecting therefrom and attached thereto a plurality of laminated magnetic metal plates extending into inductive proximity and relation with the said conductor bars.

4. An electric motor comprising a casing having field magnets therein, said motor having an axial shaft member consisting of aligned portions, one of the said portions being attached to the said casing and held stationary, another of said portions being rotary and provided with a bearing carried by the casing, said aligned portions having ends connected in revoluble relation, conductor bars arranged to extend near and by the field magnet poles, a revoluble conducting disk joining the ends of said bars, said conductor bars being constructed with parts forming the motor commutator, said commutator being carried by and insulated from a rotary shaft portion, brushes carried by the casing and arranged to contact with said commutator, said stationary axial shaft member having attached thereto and projecting radially therefrom a plurality of steel plate laminations, and the outer ends of the said laminations being extended into inductive proximity and relation with the said conductor bars.

JOSEPH W. SUYDAM.

REFERENCES CITED

The following references are of record in the file of this patent:

UNITED STATES PATENTS

| Number | Name | Date |
| --- | --- | --- |
| 2,247,645 | Suydam | July 1, 1945 |
| 495,538 | Willson | Apr. 18, 1893 |
| 1,631,186 | Apple | June 7, 1927 |
| 1,775,633 | Apple | Sept. 16, 1930 |